US012583381B2

(12) United States Patent
Kim

(10) Patent No.: US 12,583,381 B2
(45) Date of Patent: Mar. 24, 2026

(54) VEHICLE LAMP SYSTEM

(71) Applicant: HYUNDAI MOBIS CO., LTD., Seoul (KR)

(72) Inventor: Myeong Je Kim, Seoul (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 209 days.

(21) Appl. No.: 18/146,416

(22) Filed: Dec. 26, 2022

(65) Prior Publication Data

US 2024/0123897 A1 Apr. 18, 2024

(30) Foreign Application Priority Data

Oct. 14, 2022 (KR) ........................ 10-2022-0132161

(51) Int. Cl.
*B60Q 1/50* (2006.01)
*B60Q 1/00* (2006.01)
*B60Q 1/08* (2006.01)

(52) U.S. Cl.
CPC ............. *B60Q 1/50* (2013.01); *B60Q 1/0023* (2013.01); *B60Q 1/0041* (2013.01); *B60Q 1/08* (2013.01); *B60Q 2300/21* (2013.01); *B60Q 2400/50* (2013.01)

(58) Field of Classification Search
CPC ...... B60Q 1/50; B60Q 1/0023; B60Q 1/0041; B60Q 1/08; B60Q 2300/21; B60Q 2400/50
See application file for complete search history.

(56) References Cited

U.S. PATENT DOCUMENTS

2017/0110096 A1* 4/2017 Kuehn .................. G03B 17/54
2022/0136674 A1 5/2022 Won

FOREIGN PATENT DOCUMENTS

| DE | 102017115974 A1 | 1/2019 | |
| EP | 3476653 A1 | 1/2019 | |
| EP | 3690805 A1 | 8/2020 | |
| KR | 102227371 B1 | 3/2021 | |
| WO | WO-2015193714 A1 * | 12/2015 | ............... B60Q 1/08 |

OTHER PUBLICATIONS

Office Action Issued Aug. 10, 2023 in corresponding German Patent Application No. 10 2022 214 112.1.

* cited by examiner

*Primary Examiner* — Kam Wan Ma
(74) *Attorney, Agent, or Firm* — NovoTechIP International PLLC

(57) ABSTRACT

The present invention relates to a vehicle lamp system for matching two images projected on a road surface in a case where one image is output in a divided manner by a left lamp and a right lamp in image projection on the road surface by vehicle lamps.

7 Claims, 9 Drawing Sheets

IMAGE PROJECTED
ON ROAD SURFACE

GAP

OVERLAPPING

IMAGE PROJECTED ON ROAD SURFACE BY LEFT HEAD LAMP

IMAGE PROJECTED ON ROAD SURFACE BY RIGHT HEAD LAMP

IMAGE PROJECTED ON ROAD SURFACE BY LEFT HEAD LAMP

IMAGE PROJECTED ON ROAD SURFACE BY RIGHT HEAD LAMP

FIG. 4

VEHICLE LAMP SYSTEM

CROSS-REFERENCE TO RELATED APPLICATIONS

This application claims priority under 35 U.S.C. § 119 to Korean Patent Application No. 10-2022-0132161, filed on Oct. 14, 2022, in the Korean Intellectual Property Office, the disclosure of which is incorporated herein by reference in its entirety.

TECHNICAL FIELD

The following disclosure relates to a vehicle lamp system for matching two images projected on a road surface in a case where one image is output in a divided manner by a left lamp and a right lamp in image projection on the road surface by vehicle lamps.

BACKGROUND

A vehicle is a device that moves a passenger in a direction desired by the user. A typical example of the vehicle is an automobile.

Meanwhile, a vehicle lighting device may include a headlamp, a rear combination lamp, a direction indicator, and an interior lamp. The vehicle lighting device may execute only a function of securing visibility or transmitting a simple signal to other vehicles.

Recently, in addition to the basic functions of the vehicle lighting device, development of a vehicle lighting device that serves to deliver information to a driver, other vehicle drivers, pedestrians, and the like has been required. As an example, a method of projecting an image on a road surface has been proposed.

FIG. 1 is a view illustrating image projection on a road surface. Recently, a high-resolution LED market is gradually expanding, and accordingly, applications for image projection on a road surface are gradually expanding.

FIG. 2 is a view for describing a problem of a related art. In a case where one image is output using a left headlamp and a right headlamp, it is necessary to divide the corresponding image in half and match the left and right images. At this time, in a case where left and right alignment of the headlamps is not made, a phenomenon in which a gap is generated between the images projected on the road surface or the images overlap each other occurs, which impairs visibility and aesthetics.

SUMMARY

An embodiment of the present invention is directed to providing a vehicle lamp system capable of increasing convenience in use by forming an image without distortion in a case where an image is output in a divided manner by left and right headlamps.

In one general aspect, a vehicle lamp system includes: a light output unit including a first lamp and a second lamp installed in a vehicle; a memory unit storing an image; and a control unit processing an image and controlling the first lamp and the second lamp, in which the control unit divides one image into a first image and a second image, controls the first lamp to output the first image, and controls the second lamp to output the second image, and the control unit controls the first lamp and the second lamp to output grid images, respectively, to align a first projection image obtained by projecting the first image output from the first lamp on a road surface and a second projection image obtained by projecting the second image output from the second lamp on the road surface, the first and second projection images being displayed on the road surface.

In a case where the grid image output from the first lamp is a first grid image, and the grid image output from the second lamp is a second grid image, the first grid image and the second grid image may have the same size and shape.

The control unit may physically adjust an angle of at least one of the first lamp or the second lamp to align the first projection image and the second projection image.

The vehicle lamp system may further include: a camera capturing an image; and a lamp driving unit driving the first lamp and the second lamp, in which the control unit obtains, through the camera, a first projection grid image obtained by projecting the first grid image output from the first lamp on the road surface and a second projection grid image obtained by projecting the second grid image output from the second lamp on the road surface, the first and second projection grid images being displayed on the road surface, and in a case where the first projection grid image and the second projection grid image are displaced from a preset matching position, the control unit adjusts, through the lamp driving unit, the angle of at least one of the first lamp or the second lamp in such a way that the first projection grid image and the second projection grid image match each other.

The lamp driving unit may be configured to adjust the angles of the first lamp and the second lamp in at least one of a roll direction, a yaw direction, or a pitch direction.

The control unit may adjust at least one of the first image or the second image by software to align the first projection image and the second projection image.

The vehicle lamp system may further include: a camera capturing an image, in which the control unit controls the first lamp to further output a first reference image corresponding to a point within the first grid image, and controls the second lamp to further output a second reference image corresponding to a point within the second grid image, the control unit obtains, through the camera, a first projection reference image obtained by projecting the first reference image output from the first lamp on the road surface and a second projection reference image obtained by projecting the second reference image output from the second lamp on the road surface, the first and second projection reference images being displayed on the road surface, and the control unit changes, based on the first projection reference image and the second projection reference image, image output coordinates of at least one of the first image or the second image.

The first reference image may be an image of a region of a section of the first image in which the first image and the second image overlap each other, and the second reference image may be an image of the same region as the region corresponding to the first reference image.

The control unit may compare the first projection reference image and the second projection reference image to calculate a positional difference between the first projection reference image and the second projection reference image as coordinate values, and change the image output coordinates of at least one of the first image or the second image by the coordinate values.

The control unit may fix the image output coordinates of the first image and reversely change the image output coordinates of the second image by the coordinate values, or fix the image output coordinates of the second image and reversely change the image output coordinates of the first image by the coordinate values.

The control unit may calculate an unusable region from the image output coordinates of the first image to set a usable region and calculate an unusable region from the image output coordinates of the second image to set a usable region, and the control unit may change a resolution of the first image according to the usable region of the first image and output the first image, and change a resolution of the second image according to the usable region of the second image and output the second image.

The vehicle lamp system may further include a distance sensor detecting a distance from the vehicle to a point on the road surface, in which the control unit obtains, through the distance sensor, information regarding a distance from the first lamp and the second lamp to a projection surface on the road surface on which the first projection image and the second projection image are positioned, and reflects the information regarding the distance to the projection surface to correct the image output coordinates of the first image or the image output coordinates of the second image.

The vehicle lamp system may further include a user interface unit providing a setting mode to a user, in which once the user enters the setting mode, the control unit outputs the first grid image and the second grid image.

In the setting mode, the user may set at least one of an angle of the first lamp, image output coordinates of the first image, an angle of the second lamp, or image output coordinates of the second image, and the control unit may receive the information set by the user through the user interface unit and adjust the angle of the first lamp, the image output coordinates of the first image, the angle of the second lamp, or the image output coordinates of the second image.

BRIEF DESCRIPTION OF THE DRAWINGS

FIG. 4 is a conceptual diagram for describing an operation mechanism of the present invention.

DETAILED DESCRIPTION OF EMBODIMENTS

Throughout the present specification, terms such as "unit," "device," and "system," refer to a unit processing an operation of one function or a combination of two or more functions, and may be implemented as hardware, software, or a combination of hardware and software.

As used herein, terms such as "unit," "device," and "system," may be treated as equivalent to a computer-related entity, that is, hardware, a combination of hardware and software, software, or software in execution. In addition, an application program executed in the present invention may be configured in units of "units", and may be recorded in one physical memory or may be recorded in two or more memories or recording media in a distributed manner in a form in which it may be read, written, and erased.

Hereinafter, the present invention will be described in detail with reference to the accompanying drawings.

An object of the present invention is to align images output from vehicle lamps, and to obtain an image without distortion in a case where one image is output in a divided manner by left and right lamps. The lamps may be headlamps installed on a front side of a vehicle or rear lamps installed on a rear side of the vehicle, and accordingly, a projection image may be formed in front of the vehicle or a projection image may be formed behind the vehicle. However, hereinafter, for convenience of explanation, only a case where the lamps are headlamps and the projection image is formed in front of the vehicle will be described.

Figure 3:
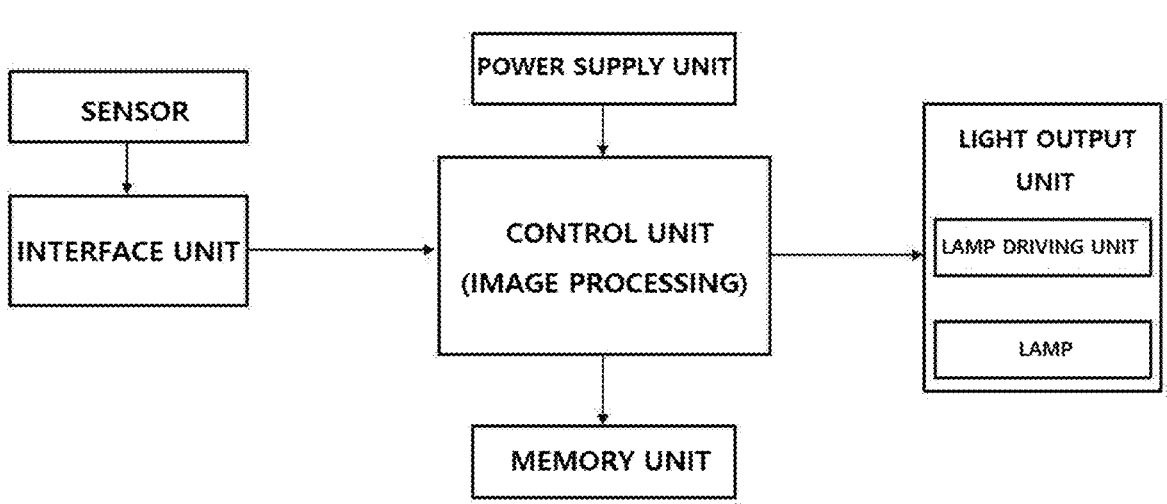
FIG. 3 is a schematic diagram of a system according to an example of the present invention.

FIG. 3 is a schematic diagram of a system according to an example of the present invention. The system may largely include a light output unit, a control unit, and a memory unit, further include a sensor unit, a power supply unit, and an interface unit, and be implemented in a vehicle.

The power supply unit receives electrical energy from a battery of the vehicle and supplies power to operate the system.

The light output unit generates light and outputs the light to the outside of the vehicle, and may include lamps and a lamp driving unit. The lamps may include a first lamp and a second lamp, and the first lamp and the second lamp may correspond to a left headlamp and a right headlamp installed on the front-left and front-right sides of the vehicle, respectively. The lamp may correspond to a high-resolution device such as a digital micro-mirror device (DMD) or a high-definition (HD) micro light emitting diode (LED). The lamp driving unit is a device for driving the lamp, and may correspond to a physical driving device such as a leveling motor or a swivel motor. The lamp driving unit may drive each of the first lamp and the second lamp separately, and may thus include a first lamp driving unit for driving the first lamp and a second lamp driving unit for driving the second lamp.

The sensor unit generates sensor information by sensing states inside or outside the vehicle. The sensor unit may include a camera and a distance sensor. The camera may generate image information by capturing an image of an area in front of the vehicle. The distance sensor may detect a distance to a point on a road surface in front of the vehicle and generate distance information from the vehicle to the corresponding point. The camera and the distance sensor may be known devices.

The interface unit receives the sensor information (for example, an image projected on the road surface by the lamp) from the vehicle and transmits the corresponding information to the control unit. Although not separately illustrated, the interface unit may include a user interface unit, and may receive a user's manipulation or setting information through the user interface unit and transmit the user's manipulation or setting information to the control unit.

The memory unit is a type of storage medium in which various types of information or programs are stored, and an image may be stored in the memory unit. The image includes a moving image or a picture.

The control unit is a type of processor that processes the image and controls the overall system including the lamps. The control unit receives one image from the memory unit, divides the received image into a first image and a second image, and controls the first lamp and the second lamp to output the obtained first and second images, respectively.

Figure 1:
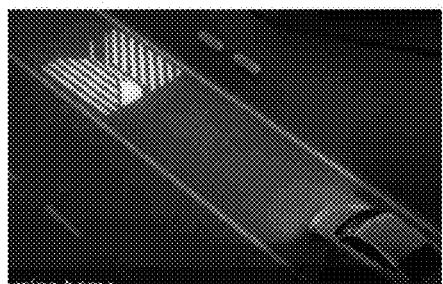
FIG. 1 is a view illustrating image projection on a road surface.
Figure 1:
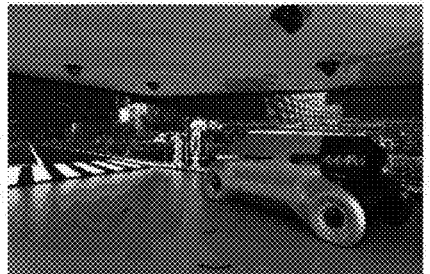
Figure 1:
Figure 2:
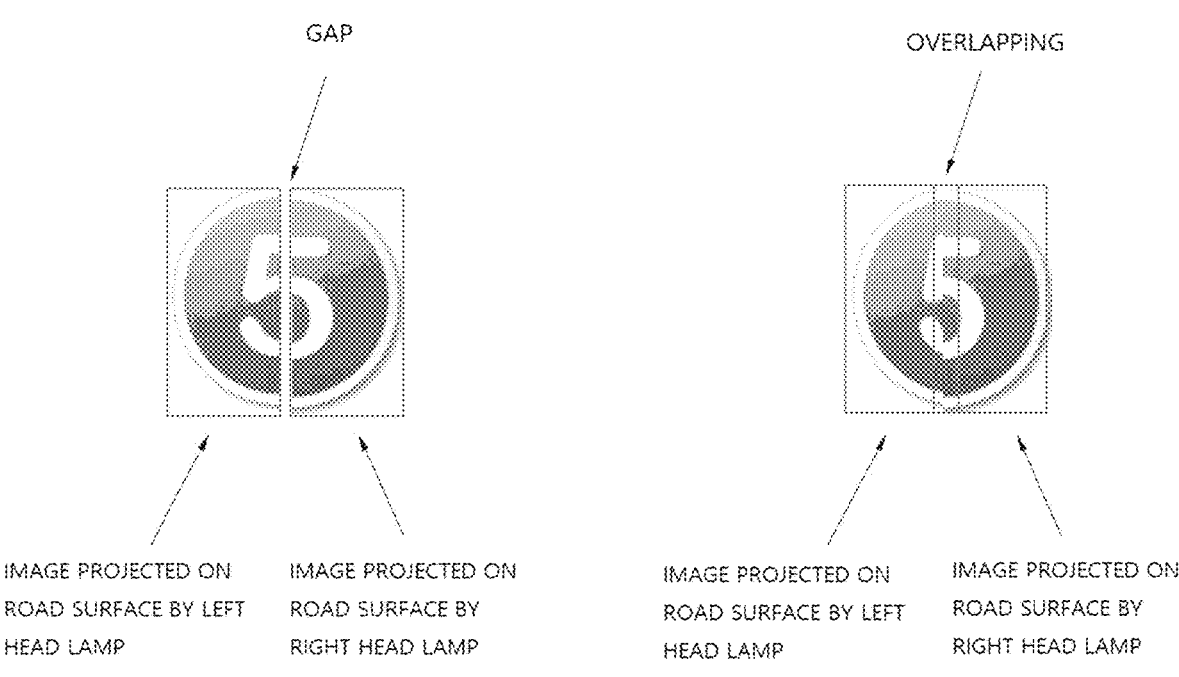
FIG. 2 is a diagram for describing problems of a related art.

At this time, as illustrated in FIG. 2, distortion due to a gap or overlapping may occur between a first projection image obtained by projecting the first image output from the first lamp on the road surface in front of the vehicle, and a second projection image obtained by projecting the second image output from the second lamp on the road surface in front of the vehicle, the first and second projection images being displayed on the road surface, and the system performs alignment to solve such a problem.

To this end, the system outputs grid images from the first lamp and the second lamp, respectively, and performs alignment based on the output grid images.

Figure 4:
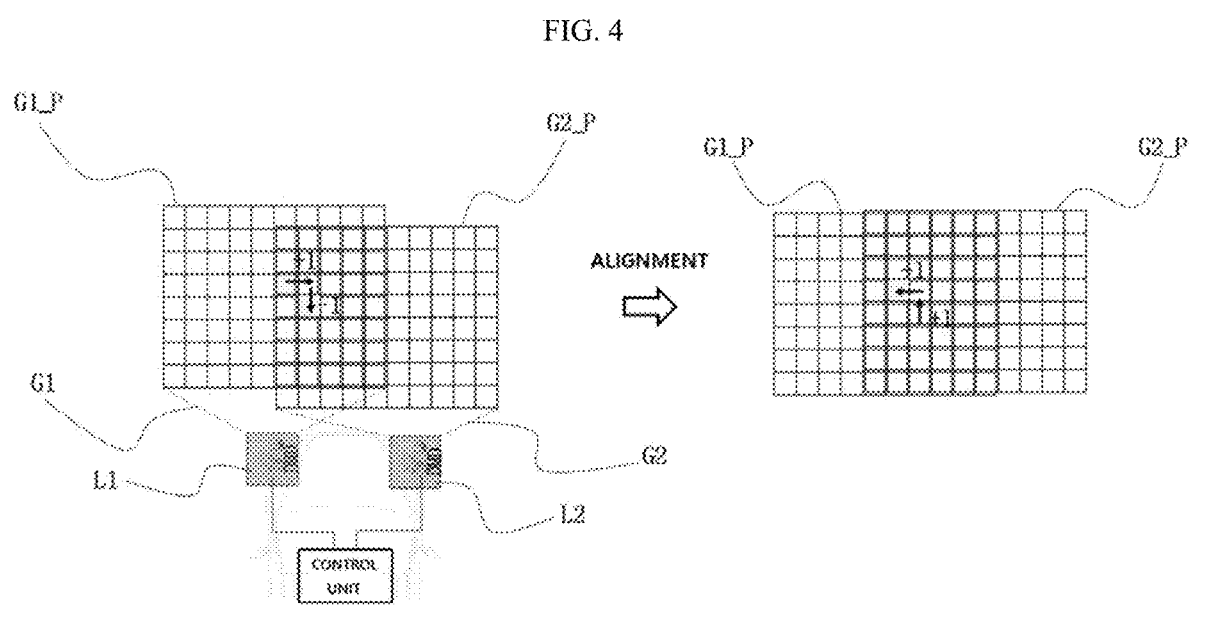

FIG. 4 is a conceptual diagram for describing an operation mechanism of the present invention. As illustrated in FIG. 4, the system performs alignment in a manner in which a first lamp L1 disposed on the front-left side of the vehicle outputs a grid image G1, a second lamp L2 disposed on the front-right side of the vehicle outputs a grid image G2, and misalignment of the grid images G1 and G2 is corrected.

More specifically, the first grid image G1 is output from the first lamp L1, and the second grid image G2 is output from the second lamp L2. Here, it is preferable in terms of ease of comparison that the first grid image G1 and the second grid image G2 have the same size and shape.

The first grid image G1 is projected on the road surface in front of the vehicle to form a first projection grid image G1_P on the road surface, and the second grid image G2 is projected on the road surface in front of the vehicle to form a second projection grid image G2_P on the road surface. The first projection grid image G1_P is formed in the same layout as that of the first projection image formed by projecting the first image output from the first lamp on the road surface, and the second projection grid image G2_P is formed in the same layout as that of the second projection image formed by projecting the second image output from the second lamp on the road surface. That is, according to the present invention, alignment is performed using the grid image instead of the image projected on the road surface.

Referring back to FIG. 4, as illustrated on the left side of FIG. 4, the first and second projection grid images may be misaligned due to beam output angles of the lamps or an inclination of the road surface in front of the vehicle. At this time, in a case where the first image and the second image are output without taking an additional operation, the first and second projection images are misaligned in the same way as the first and second projection grid images, which results in distortion caused by a gap or overlapping between the first and second projection images.

The system corrects misalignment of two grid images projected on the road surface. For example, as illustrated on the right side of FIG. 4, the first and second projection grid images are corrected to be positioned at correct positions or image output coordinates of the first and second images are corrected as described below. As the alignment is performed in this way, a gap or distortion between the first and second projection images are removed, and accordingly, one clear original image may be formed on the road surface by combining the first and second projection images.

Hereinafter, an alignment adjustment method according to each embodiment will be described.

Figure 5:
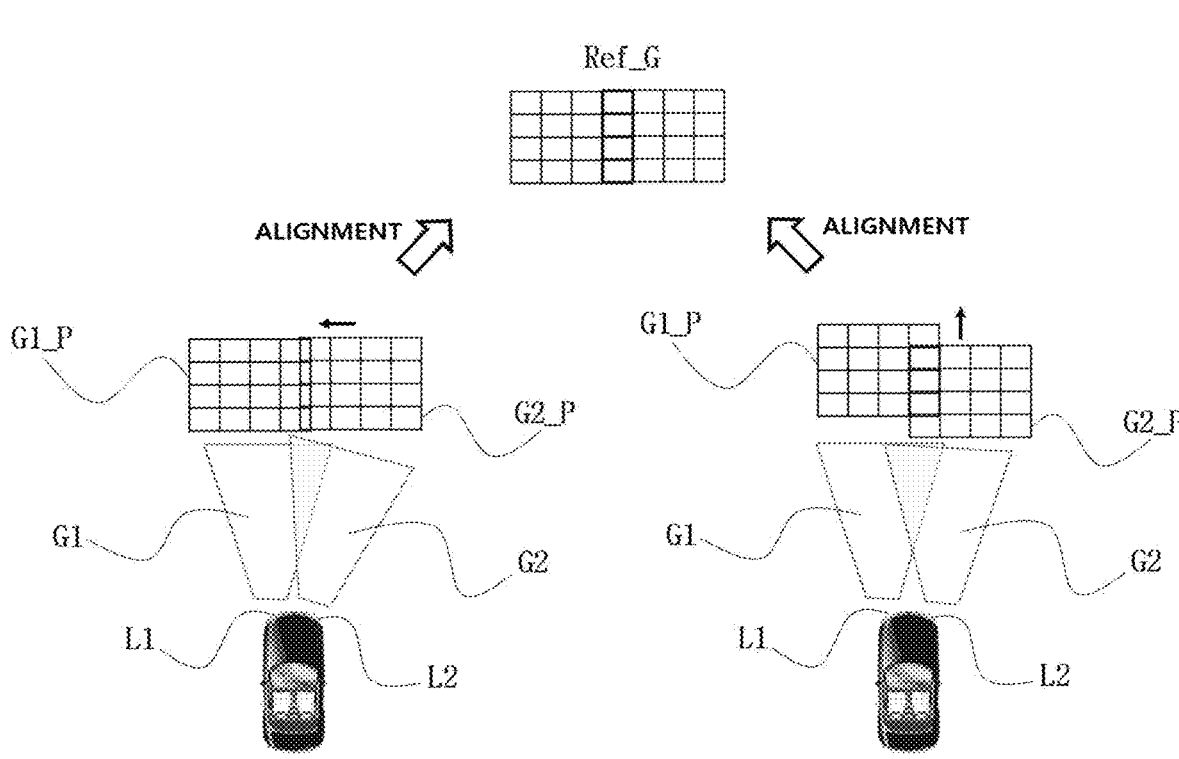
FIG. 5 is a conceptual diagram illustrating an alignment adjustment method according to a first embodiment of the present invention.

FIG. 5 is a conceptual diagram illustrating an alignment adjustment method according to a first embodiment of the present invention. According to the present embodiment, lamp image alignment is performed by physically adjusting an angle or position of the lamp.

More specifically, the control unit controls the first lamp L1 and the second lamp L2 to output the first grid image G1 and the second grid image G2, respectively, and obtains the first projection grid image G1_P and the second projection grid image G2_P formed on the road surface in front of the vehicle through the camera of the sensor unit described above.

Thereafter, the control unit determines whether or not the obtained first and second projection grid images G1_P and G2_P are displaced from a preset matching position. The preset matching position may be, for example, a reference grid line Ref_G displayed on the upper side of FIG. 5, the reference grid line Ref_G being stored in the control unit. Further, the control unit may compare the reference grid line with the obtained first and second projection grid images and determine that alignment is not achieved in a case where the first and second projection grid images are misaligned with the reference grid line. Image coordinates of the corresponding reference grid line may be stored in the reference grid line Ref_G stored together in the control unit.

In a case where it is determined that the first and second projection grid images are misaligned, the control unit adjusts the angle of at least one of the first lamp or the second lamp with the lamp driving unit in such a way that the two projection grid images match each other.

For example, as illustrated on the left side of FIG. 5, in a case where the second grid image G2 is shifted to the right with respect to the reference grid line Ref_G, the control unit may operate the swivel motor as the lamp driving unit to change the angle of the second lamp by rotating the second lamp to the left. At this time, the control unit may perform alignment in a manner in which the first and second projection grid images are compared with the preset matching position, that is, the reference grid line, to calculate two difference values, and the calculated difference values are transferred to the swivel motor. Alternatively, the alignment may be performed in a manner in which rotation of the lamp is performed until the first and second projection grid images match the reference grid line, and once the first and second projection grid images match the reference grid line, the rotation of the lamp is stopped.

Alternatively, as illustrated on the right side of FIG. 5, in a case where the second grid image G2 is shifted downward with respect to the reference grid line, the control unit may operate the leveling motor as the lamp driving unit to change the angle of the second lamp by rotating the second lamp upward. At this time, the above-described alignment method may be applied in the same way. Further, although not illustrated, the control unit may rotate the first lamp or the second lamp in forward and backward directions by using another motor as the lamp driving unit. That is, the lamp driving unit may rotate the lamp by a desired angle in each of a roll direction, a yaw direction, and a pitch direction. In addition, although not described in the drawings, it is a matter of course that the angle of the first lamp may be adjusted instead of the angle of the second lamp, or the angles of the first and second lamps may be simultaneously adjusted.

In this way, once the first projection grid image and the second projection grid image are aligned, the control unit appropriately processes one image, divides the one image into the first image and the second image, and transmits the first and second images to the first lamp and the second lamp, respectively. Since image alignment is performed based on the grid images, in a case where the first image output from the first lamp and the second image output from the second lamp are projected on the road surface and combined with each other, one original image is formed on the road surface without distortion. The first image and the second image may be formed to have the same size and not overlap each other, or may be appropriately formed in such a way that central portions thereof partially overlap each other.

According to the present embodiment, as the layouts on the road surface on which the first image and the second image are projected are aligned, it is possible to secure a maximum projection image on the road surface without wasting the layout, and it is possible to freely process the first and second images, which is advantageous.

Figure 6:
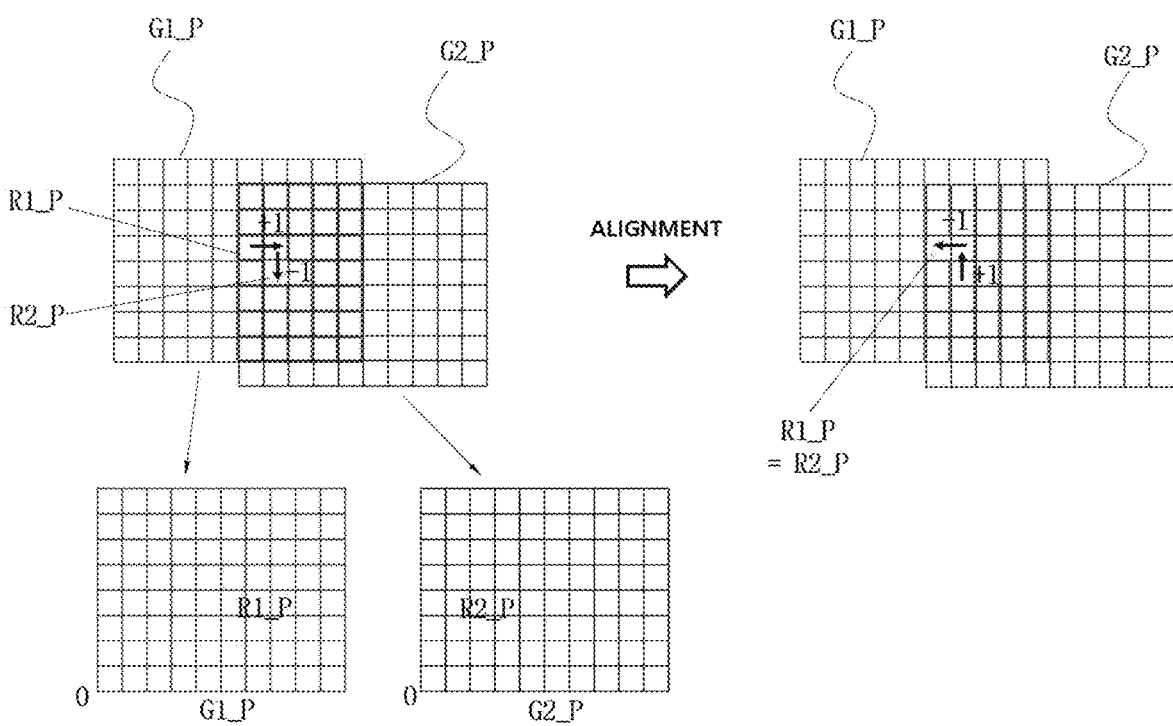
FIG. 6 is a conceptual diagram illustrating an alignment adjustment method according to a second embodiment of the present invention.
Figure 7:
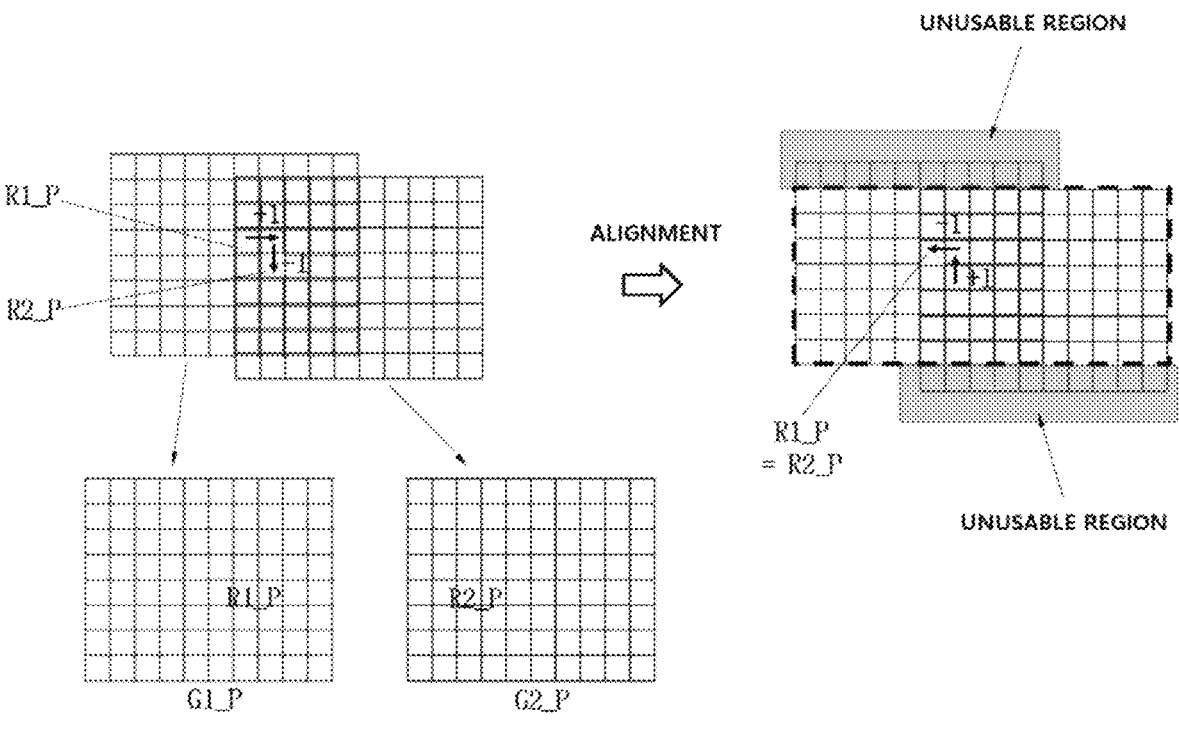
FIG. 7 is a conceptual diagram for describing setting of an unusable region in the alignment adjustment method according to the second embodiment of the present invention.
Figure 8:
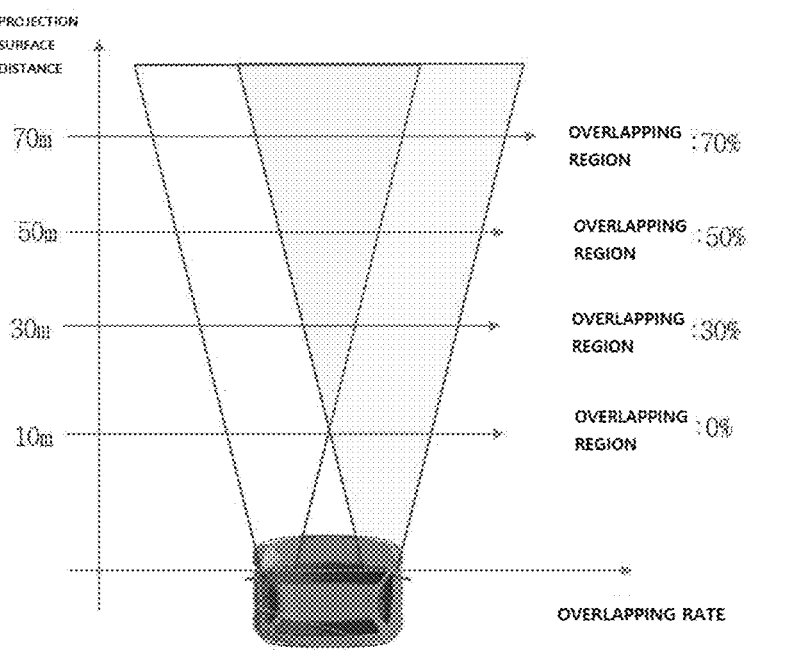
FIG. 8 is a conceptual diagram illustrating consideration of a factor related to a distance in the alignment adjustment method according to the second embodiment of the present invention.
Figure 8:
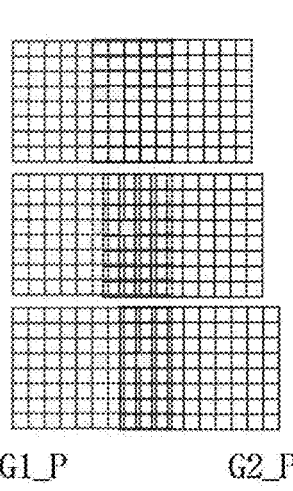

FIGS. 6 to 8 are diagrams illustrating an alignment adjustment method according to a second embodiment of the present invention. In this example, image alignment is performed by adjusting image coordinates in software.

FIG. 6 is a conceptual diagram illustrating the alignment adjustment method according to the second embodiment of the present invention. According to the present embodiment, the control unit controls the first lamp to further output a first reference image and controls the second lamp to further output a second reference image. Thereafter, the control unit obtains, through the camera of the sensor unit described above, a first projection reference image R1_P obtained by projecting the first reference image output from the first lamp on the road surface in front of the vehicle, and a second projection reference image R2_P obtained by projecting the second reference image output from the second lamp on the road surface in front of the vehicle, the first and second projection reference images R1_P and R2_P being displayed on the road surface. Then, the control unit changes image output coordinates of at least one of the first image output from the first lamp or the second image output from the second lamp, based on the first projection reference image R1_P and the second projection reference image R2_P.

Here, the first reference image R1_P is an image of a region of a section of the first image in which the first image and the second image overlap each other, and the second reference image R2_P is an image of the same region as the region corresponding to the first reference image. That is, each of the first reference image and the second reference image may correspond to an image at a position representing the same portion in the section in which the first image and the second image overlap each other in one image.

For example, the present embodiment may be implemented in a manner in which LEDs of pixels expressing the same region in an overlapping section between beams emitted from the first and second lamps are turned on, a difference between the two pixels is detected by the camera, and coordinates of the entire matrix of the image are changed as much as the difference between the pixels. Here, the first reference image and the second reference image may correspond to pixels of the same regions in the first and second lamps, which is advantageous in terms of ease of alignment.

More specifically, referring to FIG. 6, the first lamp outputs the first reference image at a point within the first grid image, and accordingly, the first projection reference image is formed at a cell that is sixth to the right of a zero point (0) and is fifth to the top of the zero point (hereinafter, denoted as (6,5)) in the first projection grid image, and the second lamp outputs the second reference image at a point within the second grid image, and accordingly, the second projection reference image is formed at a cell (2,5) based on a zero point (0) in the second projection grid image.

At this time, the first and second projection reference images represent the same region of the image, and thus need to be formed at the same positions in the first and second projection grid images. However, the positions of the images may be different from each other before alignment as illustrated in FIG. 6. This is because the two lamps are out of alignment. Therefore, the control unit may perform alignment between two images by comparing the first and second projection reference images as described above, calculating a positional difference between the two images as coordinate values, and changing the image output coordinates of at least one of the first image or the second image as much as the coordinate values.

That is, the present embodiment is different from the first embodiment, in which the angle of the lamp is physically adjusted, in that the coordinates of the image output from the lamp are changed by software. According to the first embodiment, the first and second projection grid images are aligned. According to the present embodiment, however, the first and second projection grid images are left as they are, and the output coordinates of the image output from the lamp are changed as a whole. Such a software method has an advantage over the physical method in that the lamp driving unit such as a motor is not necessary.

According to the present embodiment, the control unit may perform image alignment by fixing the image output coordinates of the first image and reversely changing the image output coordinates of the second image by the previously calculated difference coordinate values, or by fixing the image output coordinates of the second image and reversely changing the image output coordinates of the first image by the previously calculated difference coordinate values. For example, referring back to FIG. 6, the second projection reference image is shifted by one cell to the right side and shifted by one cell to the lower side with respect to the first projection reference image before alignment. The control unit may calculate the difference between the first and second projection reference images as coordinate values such as (−1,+1) and reversely correct the entire image output coordinates of the second image by (+1,−1) in a state where the image output coordinates of the first image are fixed. Accordingly, even in a case where the layouts themselves (that is, the first and second projection grid images) of the first and second images projected on the road surface do not match each other, the image output coordinates of the second image are changed according to the difference. Therefore, in a case where the two images are projected on the road surface and combined, alignment is achieved, and accordingly, one original image on the road surface can be implemented without distortion.

Meanwhile, as described above, according to the present embodiment, the first and second grid images, that is, the image output angles of the first and second lamps, are not changed, the layouts of the first and second images output from the first and second lamps and projected on the road surface may be misaligned. The present embodiment further adopts the following means to compensate for such a problem.

FIG. 7 is a conceptual diagram for describing setting of an unusable region in the alignment adjustment method according to the second embodiment of the present invention. According to the present embodiment, only the output coordinates of an image are changed by software, which may result in the unusable region in the layouts of the first and second images projected on the road surface. For example, as illustrated in FIG. 7, in a case where a first projection grid region and a second projection grid region are misaligned in a vertical direction, a partial upper region of the first projection grid region that is misaligned in a horizontal direction and a partial lower region of the second projection grid region that is misaligned in the horizontal direction are not usable. In other words, in a case where an image is output to the corresponding region, the image projected on the road surface is distorted, and thus, the corresponding region is unusable.

Accordingly, the control unit calculates an unusable region from the image output coordinates of the first image to set a usable region, and calculates an unusable region from the image output coordinates of the second image to set a usable region. Then, the control unit changes a resolution of the first image based on the usable region of the first image and outputs the first image, and the control unit changes a resolution of the second image based on the usable region of the second image and outputs the second image.

With such a configuration, it is possible to use the layout of the projection image formed on the road surface as much as possible, and one original image without distortion or cutting may be formed on the road surface.

FIG. 8 is a conceptual diagram for describing consideration of a factor related to a distance in the alignment adjustment method according to the second embodiment of the present invention, and as illustrated in FIG. 8, an overlapping section between the beams output from the first and second lamps varies depending on a projection surface distance, that is, a distance from the first lamp and the second lamp to the road surface on which the first and second projection images are positioned. Here, the projection surface distance refers to a distance from the vehicle to the road surface on which the first projection image or the second projection image is positioned. As illustrated in FIG. 8, the size of the overlapping region between the beams output from the first and second lamps increases as the projection surface distance increases. As a result, the misaligned coordinates of the first projection image and the second projection image also change. Therefore, when performing lamp image alignment, it is necessary to set a target distance.

To this end, the control unit may acquire information regarding the distance to the projection surface through the distance sensor of the sensor unit described above, and reflect the information regarding the distance to the projection surface to correct the image output coordinates of the first image or the image output coordinates of the second image. For example, in a case where the projection surface distance is relatively short, the amount of correction of the output coordinates may be relatively large, whereas in a case where the projection surface distance is relatively long, the amount of correction of the output coordinates may be relatively small.

In this way, as the information regarding the projection surface distance is further reflected for alignment by using the distance sensor, accurate alignment may be performed for each distance, which is helpful in forming an original image without distortion on the road surface.

Figure 9:
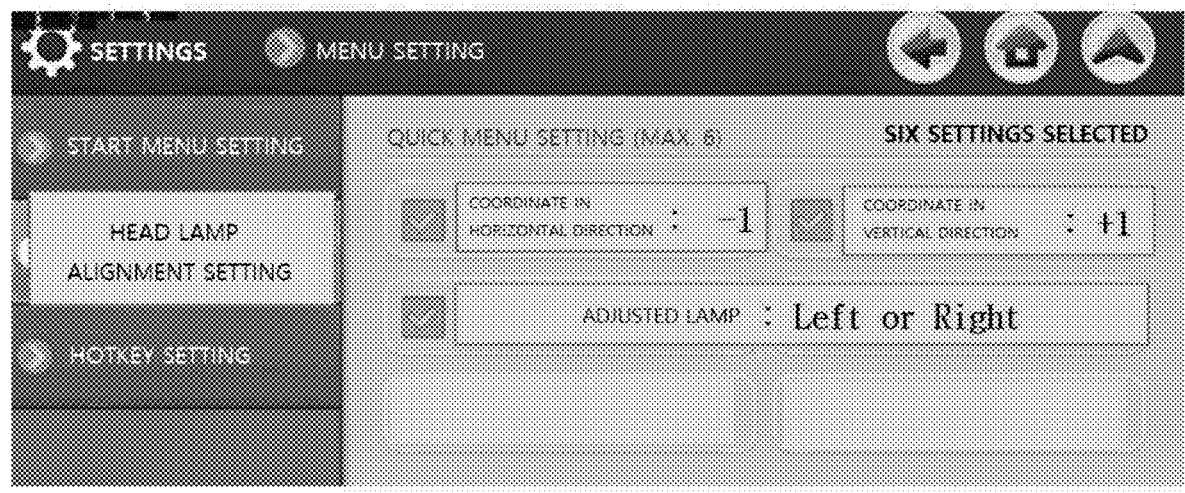
FIG. 9 is a view for describing an alignment adjustment method according to a third embodiment of the present invention.
Figure 9:
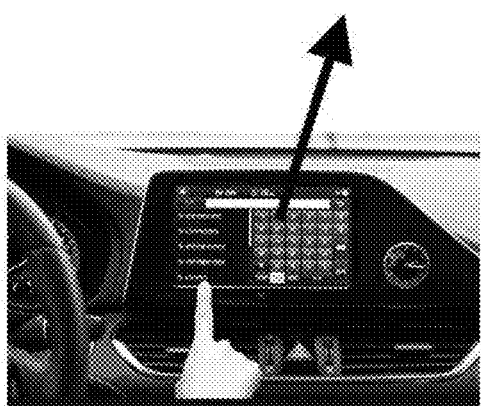

FIG. 9 is a view for describing an alignment adjustment method according to a third embodiment of the present invention. In this example, alignment is performed by a user's manipulation or setting.

More specifically, according to the present embodiment, the system further includes the above-described user interface unit, and the user interface unit includes a display for providing information to a user in the vehicle. The user interface unit provides a setting mode to the user through the display, and once the user enters the setting mode, the control unit controls the first and second lamps to output the first and second grid images, respectively. The first and second grid images output from the first and second lamps form the first and second projection grid images on the road surface, and the user may perform alignment by adjusting the angle of the lamp or the image output angle while viewing the first and second projection grid images formed on the road surface. For example, the display may be configured as a touch type display, and the user may input various types of information through the display.

The control unit performs lamp image alignment based on various types of information input by the user. At this time, the alignment method may be the above-described physical method, software method, or a combination thereof.

More specifically, in the setting mode, the user may set at least one of the angle of the first lamp, the image output coordinates of the first image, the angle of the second lamp, or the image output coordinates of the second image. The control unit receives the information set by the user through the user interface unit and adjusts the angle of the first lamp, the image output coordinates of the first image, the angle of the second lamp, or the image output coordinates of the second image.

According to the present embodiment, the user is directly involved in lamp image alignment, so that a preference of the user may be reflected, and errors or failures in automatic alignment by the control unit may be corrected.

According to the present invention, it is possible to obtain, by image alignment, an image projected on a road surface without distortion, thereby increasing convenience in use and improving visibility and aesthetics.

Although embodiments of the present invention have been hereinabove described with reference to the accompanying drawings, those skilled in the art to which the present invention pertains will be able to understand that the present invention may be implemented in other specific forms without departing from the spirit or essential feature of the present invention. Therefore, it is to be understood that embodiments described hereinabove are illustrative rather than being restrictive in all aspects.

What is claimed is:

1. A vehicle lamp system comprising:
a light output unit including a first lamp and a second lamp installed in a vehicle;
a memory unit for storing an image;
a camera capturing an image; and
a control unit for processing the image and controlling the first lamp and the second lamp,
wherein the control unit is configured to divide a single image into a first image and a second image, control the first lamp to output the first image, and control the second lamp to output the second image, the first and second images respectively containing two mutually different portions of the single image,
wherein the control unit is further configured to control the first lamp and the second lamp to output grid images, respectively, to align a first projection image obtained by projecting the first image output from the first lamp on a road surface and a second projection image obtained by projecting the second image output from the second lamp on the road surface, the first and second projection images being displayed on the road surface, wherein the control unit obtains, through the camera, a first projection grid image obtained by projecting the first grid image output from the first lamp on the road surface and a second projection grid image obtained by projecting the second grid image output from the second lamp on the road surface, the first and second projection grid images being displayed on the road surface, and wherein, based on overlapping area where a portion of the first projection grid image overlap with the second projection grid image, the control unit adjusts at least one of the first projection grid image or the second projection grid image.

2. The vehicle lamp system of claim 1, wherein, when the grid image output from the first lamp is a first grid image, and the grid image output from the second lamp is a second grid image, the first grid image and the second grid image have a same size and shape.

3. The vehicle lamp system of claim 2, wherein the control unit physically adjusts an angle of at least one of the first lamp or the second lamp to align the first projection image and the second projection image.

4. The vehicle lamp system of claim 3, further comprising a lamp driving unit driving the first lamp and the second lamp, when the first projection grid image and the second projection grid image are displaced from a preset matching position, the control unit adjusts, through the lamp driving unit, the angle of at least one of the first lamp or the second lamp in such a way that the first projection grid image and the second projection grid image match each other.

5. The vehicle lamp system of claim 4, wherein the lamp driving unit is configured to adjust the angles of the first lamp and the second lamp in at least one of a roll direction, a yaw direction, or a pitch direction.

6. The vehicle lamp system of claim 2, further comprising a user interface unit for providing a setting mode to a user, wherein, once the user enters the setting mode, the control unit outputs the first grid image and the second grid image.

7. A vehicle lamp system comprising:

a light output unit including a first lamp and a second lamp installed in a vehicle;

a memory unit for storing an image;

a control unit for processing the image and controlling the first lamp and the second lamp; and a user interface unit for providing a setting mode to a user, wherein the control unit is configured to divide one image into a first image and a second image, control the first lamp to output the first image, and control the second lamp to output the second image, and wherein the control unit is further configured to control the first lamp and the second lamp to output grid images, respectively, to align a first projection image obtained by projecting the first image output from the first lamp on a road surface and a second projection image obtained by projecting the second image output from the second lamp on the road surface, the first and second projection images being displayed on the road surface, wherein, when the grid image output from the first lamp is a first grid image, and the grid image output from the second lamp is a second grid image, the first grid image and the second grid image have a same size and shape, wherein, in the setting mode, the user is enabled to set at least one of an angle of the first lamp, image output coordinates of the first image, an angle of the second lamp, or image output coordinates of the second image, and wherein the control unit receives information set by the user through the user interface unit and adjusts the angle of the first lamp, the image output coordinates of the first image, the angle of the second lamp, or the image output coordinates of the second image.

* * * * *